Patented May 4, 1954

2,677,680

UNITED STATES PATENT OFFICE 2,677,680

PROCESS FOR THE MANUFACTURE OF RIBOFLAVIN PHOSPHATE

Alexander Lang Morrison and Frank Ratcliffe Atherton, Welwyn Garden City, England, assignors to Hoffmann-La Roche Inc., Nutley, N. J., a corporation of New Jersey No Drawing. Application September 28, 1951, Serial No. 248,868

Claims priority, application Great Britain November 10, 1950

2 Claims. (Cl. 260—211.3)

The present invention is concerned with improvements in or relating to the manufacture of riboflavin phosphate.

It has been found that riboflavin phosphate can be prepared in good yield by the phosphorylation of riboflavin with phosphorus pentoxide in phenol, in which both are soluble, at moderate temperatures.

Accordingly, an improved process for the manufacture of riboflavin phosphate is provided which process comprises treating riboflavin with phosphorus pentoxide in phenol solution at temperatures not exceeding 100° C., preferably at about 20° C. to 40° C.

Since phenol is a solid up to 43° C. it may be necessary to add sufficient inert solvent so as to render the phenol liquid at the temperature at which the reaction is to be carried out. By inert organic solvent as used herein is meant an organic solvent which does not chemically react with riboflavin, phosphorus pentoxide or the phenol present in the reaction mixture. Of such solvents may be mentioned by way of example chloroform, ethylene dichloride and other polyhalogenated alkanes and benzene.

The riboflavin is preferably first dissolved in the phenol or a solution of phenol in the inert solvent, using heat if necessary, and the phosphorus pentoxide is then added to the resulting liquid which has been cooled to the desired reaction temperature. The reaction is completed in about five hours or less, depending on the temperature. The preferred temperature range makes for a lesser amount of by-products.

The following example illustrates the manner in which the present process may be carried into effect:

Example

A mixture of 3.76 g. dry riboflavin, 120 g. phenol and 40 cc. dry chloroform was heated with stirring until a clear solution was obtained. After cooling to 20° C., 5 g. phosphorus pentoxide were added and the mixture was stirred at room temperature for 5 hours. The clear red solution was then poured into 500 cc. dry ether and the mixture was refrigerated for 16 hours. The yellow precipitate was filtered off, washed well with dry ether and immediately dried in vacuo over phosphorus pentoxide.

The dried solid was dissolved in 10 cc. concentrated hydrochloric acid and the clear red solution was kept at room temperature for 2 hours. 30 cc. water were then added and the mixture was refrigerated for 16 hours. The orange precipitate was filtered, washed with dilute hydrochloric acid (3N) and acetone, and dried in vacuo over phosphorus pentoxide. The product so obtained (3.1 g., 68%) consisted substantially of riboflavin monophosphate. On potentiometric titration, the acid exhibited pH breaks at pH 4.4 and pH 8.4, the alkali uptakes at these breaks being 92% and 87% respectively of the theoretical values.

The product could be purified by conversion to the monodiethanolamine salt in the following manner:

The crude acid (1.5 g.) was stirred with a solution of 0.55 g. diethanolamine in 20 cc. distilled water and the resultant turbid solution was clarified by filtration through Hyflo supercel. The filtrate and washings were concentrated by evaporation in vacuo to the original bulk (20 cc.), the pH of the solution adjusted with acetic acid to pH 4.9 and the salt precipitated by the addition of 200 cc. alcohol. After standing overnight the supernatent liquid was decanted and the residue was filtered and washed with alcohol and acetone. This material (1.3 g.) had a melting point of 209–210° C. and analysed for a dihydrate of the monodiethanolamine salt of riboflavin monophosphate.

We claim:

1. A process for the manufacture of riboflavin phosphate which comprises treating riboflavin with phosphorus pentoxide in phenol solution at temperatures not exceeding 100° C.

2. A process in accordance with claim 1 wherein an inert organic solvent miscible with phenol is admixed with the phenol and the reaction is carried out at a temperature of between 20° C. and 40° C.

References Cited in the file of this patent

UNITED STATES PATENTS

| Number | Name | Date |
|---|---|---|
| 2,111,491 | Kuhn et al. | Mar. 15, 1938 |
| 2,449,003 | Moos | Sept. 7, 1948 |
| 2,535,385 | Breivogel | Dec. 26, 1950 |

OTHER REFERENCES

Kosolapoff, Organo-Phosphorus Compounds, pages 220–221, 1950.